Nov. 26, 1957  E. E. HARDESTY ET AL  2,814,718
RESISTANCE WELDING METHODS AND APPARATUS
Filed Aug. 8, 1956  2 Sheets-Sheet 1

INVENTORS
ETHRIDGE E. HARDESTY &
ANSELL K. HILL
BY
Campbell, Brumbaugh, Free & Graves
their ATTORNEYS

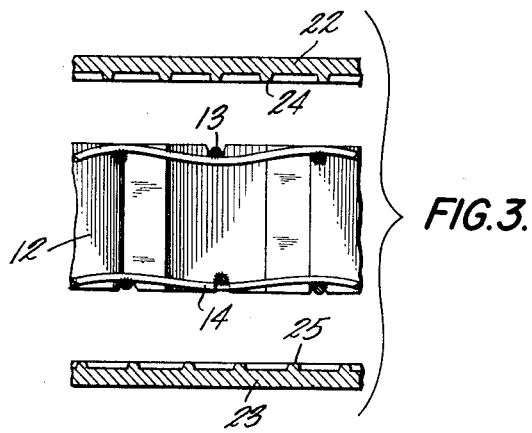
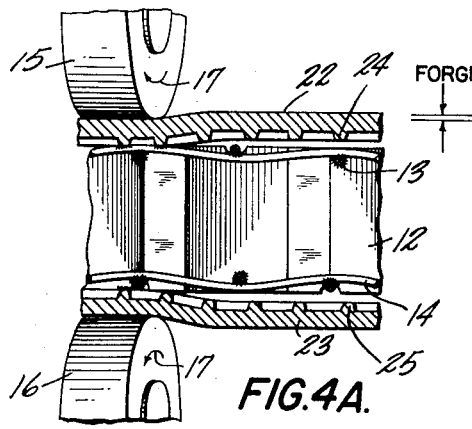
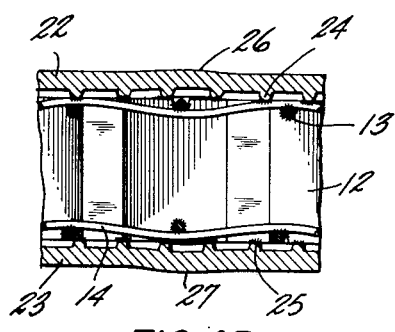
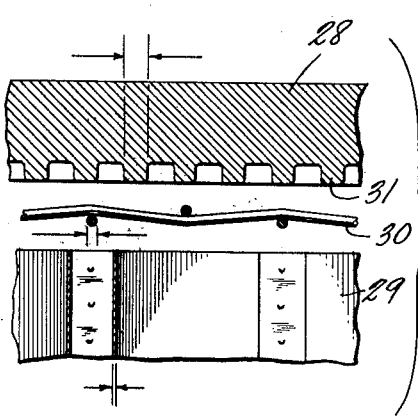

United States Patent Office 2,814,718
Patented Nov. 26, 1957

2,814,718

RESISTANCE WELDING METHODS AND APPARATUS

Ethridge E. Hardesty, Balboa Island, and Ansell K. Hill, Costa Mesa, Calif., assignors to Fairchild Engine and Airplane Corporation, Hagerstown, Md., a corporation of Maryland Application August 8, 1956, Serial No. 602,774

6 Claims. (Cl. 219—107)

This invention relates to resistance welding of metal elements having different thicknesses, and has particular reference to such welding of sheet metal to supporting structure without undue forging effects.

In welding sheet metal to supporting structure such as occurs in the formation of structure termed honeycomb sandwich, advances have been made in strengthening the bond between the metal sheet or skin and core elements, as discussed in copending applications Serial Nos. 560,371 and 474,863 filed January 20, 1956 and December 13, 1954, respectively. The first mentioned of these applications provides for the use of a relatively high conductivity metal layer on the core elements to preclude excessive heating that tends to destroy the core and to afford adequate welding temperatures between the metal skin and core. The other application deals with the use of closely spaced resistance points between sheet metal and the core to control the resulting weldments.

While the foregoing arrangements greatly assist the production of honeycomb sandwich and similar structural pieces, some difficulty is still experienced in welding structures of this nature from ridging due to forging during the weld period.

In further connection with forging and ridging as the weld is made, an electrode wheel on the skin presses it against a metal mesh, for example, interposed between the core and skin. This results in the mesh being forced into and embedded in the core with a depression of the skin at that point and along the line of travel of the electrode wheel. It is highly desirable to minimize such skin depression in order to provide a finished product having a smooth outer surface free from residual stresses.

It has been found that it is difficult to weld metal pieces together when their thickness ratio is greater than about 4 to 1. In instances where the skin to core ratio exceeds this amount, adequate welding strengths have been extremely difficult to achieve. The above-outlined efforts, while strengthening the weldments, have not resulted in the formation of honeycomb sandwich having all of the desired structural characteristics necessary for use in critical operations.

The present invention overcomes the above difficulties and provides a method of resistance welding that will unite sheet metal and supporting elements having any desired thickness ratio with a minimum amount of forging therebetween. This is accomplished by the provision of an embossed surface on the inner face of the metal sheet or sheets and, where desirable, the prewelding of a metal mesh such as wire screening into the edges of the metal sheet supporting member. The embossed ridges and metal mesh dimensions are chosen with regard to the thickness ratio between the metal sheet and the supporting thickness. By selecting proper dimensions, thick metal skin may be welded to very thin honeycomb core, for example, in honeycomb sandwich structure.

These and further advantages of the present invention will be more readily understood when the following description is read in connection with the accompanying drawings in which:

Figure 3 is a fragmentary vertical section, partially exploded, of honeycomb sandwich elements in which a wire mesh has been prewelded into the honeycomb core;

Figures 4A and 4B illustrate sections of honeycomb sandwich similar to those shown in Figures 2A and 2B but utilizing the principles of the present invention;

Figure 5 is an exploded fragmentary vertical section of still a further honeycomb sandwich illustrating the method of welding a very thick metal skin to a very thin core.

Figures 2A, 2B:
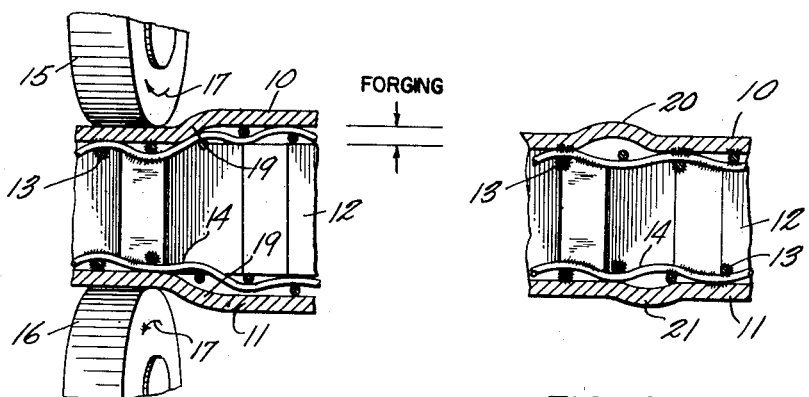
Figures 2A and 2B are fragmentary vertical sections illustrating the formation of honeycomb sandwich utilizing a metal mesh between the skin and core elements and particularly showing the formation of undesirable ridges.

Referring to the invention in greater detail with particular reference to Figures 2A and 2B, metal skins 10 and 11 are positioned adjacent to both edges of a metal honeycomb core 12, wire screening 13 and 14 being respectively interposed between the skins 10 and 11 and the core 12. Wheel type electrodes 15 and 16 between which welding current flows in accordance with conventional practice are urged together and travel along the composite sandwich as indicated by arrows 17.

It will be apparent that welding of the structure shown in Figure 2A will result in the wire screens 13 and 14 becoming embedded in the core 12 causing local depressions in the sandwich along the paths of travel of the electrode wheels 15 and 16. This is clearly shown in Figure 2A wherein the reference numeral 19 indicates the distorted portion of the skins 10 and 11. The actual amount of forging depends on the dimensions of the various elements involved and may be as great as two or three times the thickness of the wire used in the wire mesh 13 and 14.

After adjacent passes of the welding wheels 15 and 16 over the skins 10 and 11, ridges 20 and 21 are formed in the honeycomb sandwich structure, these being indicative of residual stresses. In addition, the weldments under the ridges are, of course, of very poor quality.

Referring next to Figures 1, 3, 4A and 4B, metal sheets 22 and 23 are embossed to form ridges 24 and 25, respectively, having a width related to the remaining structural elements, as will be explained in greater detail hereinafter. The honeycomb core 12 is shown with the wire screens 13 and 14 welded into its opposite edges, this step being taken prior to the assembly of the honeycomb sandwich (Figure 3). At this time, the elements are prepared for the final welding operation illustrated in Figure 4A.

The welding electrode wheels 15 and 16 urge the metal sheets 22 and 23 against the opposite edges of the core 12. However, since the wire screens 13 and 14 have already been embedded and firmly attached to the edge of core 12, the actual welding process results in little if any forging, as indicated in Figure 4A. In actual practice, the forging has been found to be between .000 and .002 inch, depending upon the gauge of the metal sheets 22 and 23. This is to be contrasted with the .020 to .030 forging encountered when following other welding methods with similarly sized components.

Figure 1:
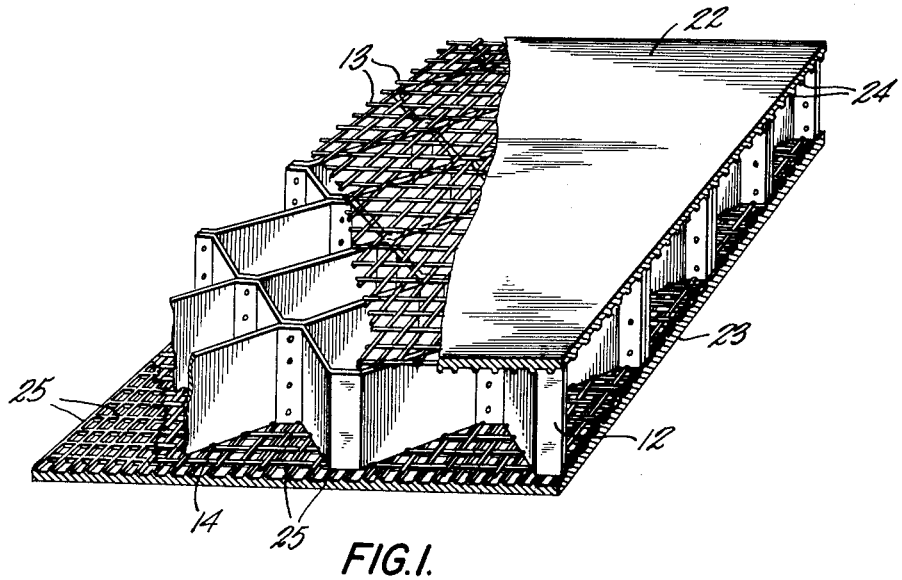
Figure 1 is a view in perspective, partially broken away, of honeycomb sandwich constructed in accordance with the present invention.

Figure 4B illustrates a honeycomb sandwich welded in accordance with the invention illustrating the very minor ridges 26 and 27 produced under certain conditions, other structures being formed without any ridging. For example, the honeycomb sandwich of Figure 1, showing the relation of the components employed in the inventive welding process, was formed without ridges.

In connection with welding structures such as honeycomb sandwich, it has been found that it is difficult to weld one metal piece to another where the thickness ratio is greater than 4 to 1. For example, the structure illustrated in Figure 5 includes a very thick metal skin 28 which must be welded to a very thin metal core 29 having a thickness on the order of .001 inch, for example. It is apparent that to provide an efficient and strong weld, a metal mesh such as wire screen 30 must be formed of wire having a thickness no greater than 4 or 5 times that of the core 29. Therefore, in the example under consideration, the wire diameter is about .004 inch.

In order to provide strong weldments between the wire screen 30 and the thick metal sheet 28, ridges 31 must be embossed thereon, such ridges having a width determined by the thickness of the wire forming the screen 28. In the present instance, to fall within the thickness ratio of 4 or 5 to 1, the ridges should be approximately .016 inch in width. With the foregoing arrangement indicated by dimension arrows in Figure 5, the thickness between the core and skin is stepped by use of the wire 30 and ridges 31 to provide a strong, effective weld and it is obvious that these principles may be utilized in welding any similar materials of varying thicknesses.

In order to weld the elements of Figure 5 together, the wire mesh 30 is first welded into the edges of the core 29 and subsequently, the skin 28 is welded to the wire and core 29, as discussed in greater detail in connection with Figure 4A.

It will be apparent that the foregoing methods permit the welding of structural materials such as honeycomb sandwich with a minimum of forging effects and in addition, facilitate the welding of very thick metal elements to thin metal pieces. Furthermore, it will be understood that the above-described embodiments of the invention are illustrative only and modifications thereof will occur to those skilled in the art. For example, the principles of this invention may, of course, be applied to resistance welding applications in which problems similar to those found in welding honeycomb sandwich are encountered. Accordingly, the invention is not to be limited to the specific apparatus disclosed herein but is to be defined by the appended claims.

We claim:

1. A method of resistance welding a metal sheet to the edges of a thin walled metal supporting element comprising the steps of welding a metal mesh into the edges of the supporting element, urging the sheet against the mesh and edges, and passing a welding current between the sheet and the supporting element to weld them together.

2. A method of resistance welding a metal sheet to the edges of a thin walled metal supporting element comprising the steps of welding a metal mesh into the edges of the supporting element, embossing ridges on one face of the metal sheet, urging the ridged face of the sheet against the mesh and the edges, and passing a welding current through the sheet and the supporting element to weld them together.

3. A method of resistance welding the edges of a thin walled metal supporting element to a metal sheet at least four times thicker comprising the steps of interposing between the metal element and the sheet a metal mesh formed of elements having a thickness intermediate the thickness of the metal sheet and supporting element, welding the metal mesh into the edges of the supporting element, embossing ridges on one face of the metal sheet, the ridges having a thickness not more than four times that of the metal mesh elements, urging the ridged face of the sheet against the mesh and the edges, and passing a welding current between the sheet and the supporting element to weld them together.

4. A method of resistance welding a pair of metal sheets to the opposite edges of a honeycomb core formed of thin metal strips comprising the steps of welding a metal mesh into the opposite edges of the core, embossing ridges on one face of each of the metal sheets, urging the ridged faces of the sheets against the meshes and the edges, and passing a welding current between the sheets and the core to weld them together.

5. A method of resistance welding the opposite edges of a honeycomb core formed of thin metal strips to a pair of metal sheets at least four times thicker comprising the steps of interposing between the core and the sheets a pair of metal meshes formed of elements having a thickness intermediate the thickness of the metal sheets and the core, welding the metal meshes into the opposite edges of the core, embossing ridges on one face of each of the metal sheets, the ridges having a thickness not more than four times that of the metal mesh elements, urging the ridged faces of the sheets against the meshes and the edges, and passing welding current between the sheets and the core to weld them together.

6. A method of resistance welding a pair of metal sheets to the opposite edges of a honeycomb core formed of thin metal strips comprising the steps of welding a metal mesh into the opposite edges of the core, urging the sheets against the meshes and the edges, and passing a welding current between the sheets and the core to weld them together.

References Cited in the file of this patent

UNITED STATES PATENTS

| | | |
|---|---|---|
| 1,042,885 | Budd et al. | Oct. 29, 1912 |
| 1,156,898 | Gravell | Oct. 19, 1915 |
| 2,056,563 | Budd | Oct. 6, 1936 |
| 2,108,795 | Budd | Feb. 22, 1938 |
| 2,327,265 | Herr | Aug. 17, 1943 |
| 2,333,600 | Trautvetter | Nov. 2, 1943 |
| 2,609,068 | Pajak | Sept. 2, 1952 |
| 2,720,948 | Pajak | Oct. 18, 1955 |